United States Patent Office 2,828,625
Patented Apr. 1, 1958

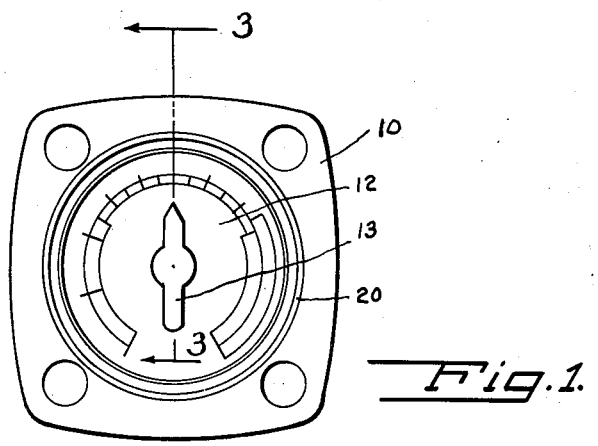
*Fig.1.*
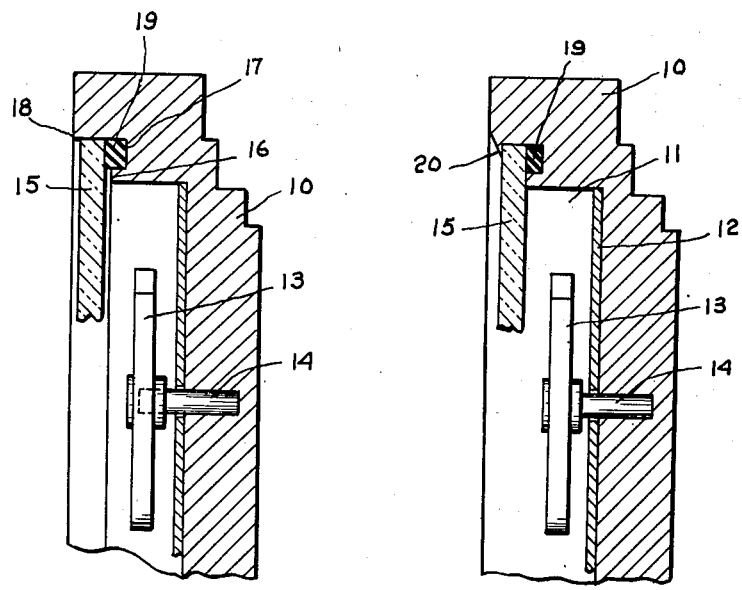
*Fig.2.*     *Fig.3.*
INVENTORS.
JEHU MORPHIS
PAUL B. JOHNSON
BY
*ATTORNEY.*

2,828,625
CONVERSION DIAL ATTACHMENT FOR GAUGE

Jehu Morphis and Paul B. Johnson, Garland, Tex., assignors, by mesne assignments, to Leta S. Taylor, individually and as trustee Application November 30, 1954, Serial No. 471,986

1 Claim. (Cl. 73—431)

This invention relates to indicating instruments such as liquid level gauges having crystals or sight glasses and to a new and improved means for securing the crystal or sight glass on the head of such instrument so as to form a seal connection and prevent dirt or moisture from entering the gauge head.

An object of the invention is to provide a new and improved arrangement for securing the crystal or sight glass of an indicating instrument for the purpose set forth above.

Another object is to provide such a connection which is relatively simple and inexpensive in construction and efficient in operation.

Another object is to provide a liquid level gauge having a crystal or sight glass secured over the dial thereof in such manner that the dial chamber is completely sealed.

Other objects of the invention will be apparent from the following description taken in connection with the accompanying drawings.

In the drawings:

Fig. 1 is a top or face view of a dial for an indicating instrument embodying the invention;

Fig. 2 is a sectional view taken on line 3—3 of Fig. 1 and showing one step in the method of forming the device of the invention; and Fig. 3 is a view similar to Fig. 2, but showing a crystal in sealed relation on the gauge head.

Referring more particularly to the drawings wherein similar reference characters designate corresponding parts throughout, there is shown a gauge head 10 adapted for use on a liquid level gauge such as may be employed on storage tanks for butane, propane and other liquified petroleum gases.

The head 10 is provided with the recess or chamber 11 in which is mounted the dial 12 adapted to cooperatively function with the indicator needle 13 which is pivotally mounted on the bearing 14.

The head 10 is preferably formed by die casting or other suitable process and is completely sealed except for the opening over chamber 11 which must be covered with a transparent sight glass or crystal to allow observation of the indicator 13 and dial 12.

In order to form a sealed connection between the crystal or sight glass 15, a peripheral radial faced shoulder 16 is formed surrounding chamber 11 and in shoulder 16 is provided the peripheral groove 17 surrounding which is the upstanding axially extending flange 18.

In the peripheral groove 17 is positioned a gasket, or the like 19, of a resilient material, which gasket is slightly thicker than the depth of groove 17, as shown in Fig. 2.

Over shoulder 16 and gasket 19 is positioned the sight glass or crystal 15 which is then pressed to a position where the inner surface of the crystal is substantially flush with the surface of the shoulder and the upstanding flange 18 is then rolled over to form the lip 20 overlying and pressing axially against the periphery of crystal 15 to retain crystal 15 in such position and thereby compressing gasket 19 to form a sealed connection between the periphery of the crystal and the shoulder on the gauge head to prevent the entrance of moisture, dust or other foreign material into the chamber 11.

While the invention has been described in connection with a liquid level gauge, it is obvious that it may be applied to other forms of gauges where it is desired to form a sealing connection between a sight glass which overlies a chamber containing a dial to form a sealing connection between the periphery of the crystal and the adjacent portion of the head.

From the foregoing it will be seen that we have provided new and improved means for obtaining all of the objects and advantages of the invention.

We claim:

In a device of the character described, a die cast gauge casing having an integral base and a peripheral side wall forming a completely sealed recess except for an opening at the front side, a dial and indicator in said recess, said side wall having a forwardly facing shoulder surrounding said recess, the front face of said shoulder having an annular groove therein, a resilient member in said groove having a normal thickness greater than the depth of said groove and tending to protrude therefrom, a relatively flat crystal supported on said resilient member, an integral peripheral flange on said side wall surrounding said shoulder and projecting forwardly beyond the front peripheral surface of said crystal, the inner front edge portion of said flange being pressure deformed axially of said casing to form a lip overlying the peripheral edge of said crystal and pressing the crystal axially against said resilient member to form a sealed connection between the periphery of said crystal and said gauge casing.

References Cited in the file of this patent
UNITED STATES PATENTS

| | | |
|---|---|---|
| 785,830 | Porter | Mar. 28, 1905 |
| 855,473 | McAlpine | June 4, 1907 |
| 1,902,998 | Hans | Mar. 28, 1933 |
| 2,178,799 | Loen | Nov. 7, 1939 |
| 2,215,570 | Sylvander | Sept. 24, 1940 |
| 2,609,691 | Kirwan | Sept. 9, 1952 |
| 2,681,034 | Mannion | June 15, 1954 |